United States Patent
Wang et al.

(10) Patent No.: US 9,785,271 B2
(45) Date of Patent: Oct. 10, 2017

(54) GATE DRIVE CIRCUIT, CASCADE GATE DRIVE CIRCUIT AND METHOD FOR DRIVING CASCADE GATE DRIVE CIRCUIT

(71) Applicants: SHANGHAI TIANMA MICRO-ELECTRONICS CO., LTD., Shanghai (CN); TIANMA MICRO-ELECTRONICS CO., LTD., Shenzhen (CN)

(72) Inventors: Lihua Wang, Shanghai (CN); Conghua Ma, Shanghai (CN); Qijun Yao, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 36 days.

(21) Appl. No.: 15/147,867

(22) Filed: May 5, 2016

(65) Prior Publication Data
US 2017/0123539 A1    May 4, 2017

(30) Foreign Application Priority Data
Oct. 29, 2015    (CN) .......................... 2015 1 0718070

(51) Int. Cl.
*G06F 3/041* (2006.01)
*G09G 3/36* (2006.01)

(52) U.S. Cl.
CPC ......... *G06F 3/0412* (2013.01); *G09G 3/3677* (2013.01); *G06F 2203/04111* (2013.01);
(Continued)

(58) Field of Classification Search
None
See application file for complete search history.

(56) References Cited

U.S. PATENT DOCUMENTS

2008/0297495 A1* 12/2008 Jung .................. G09G 3/20
                                                                                   345/204
2010/0109996 A1*  5/2010 Park .................. G09G 3/3677
                                                                                   345/100
(Continued)

FOREIGN PATENT DOCUMENTS

CN    104062017 A    9/2014
CN    104077996 A    10/2014

*Primary Examiner* — Nicholas Lee
(74) *Attorney, Agent, or Firm* — Kilpatrick Townsend & Stockton LLP

(57) ABSTRACT

A gate drive circuit, includes a driving transistor and a switching transistor. A gate electrode of the switching transistor is configured to receive first switching signal. A first electrode of the switching transistor is configured to receive second switching signal. A second electrode of the switching transistor is connected to gate electrode of the driving transistor. A first electrode of driving transistor is configured to receive first control signal, and a second electrode of driving transistor is connected to output terminal. During display period, the first control signal is display scanning signal, the first switching signal switches the switching transistor off, the driving transistor is switched on and the driving transistor outputs the display scanning signal. During touch-control period, the first control signal is touch scanning signal, the first switching signal switches the switching transistor on, the second switching signal switches the driving transistor on, and the driving transistor outputs the touch scanning signal.

15 Claims, 7 Drawing Sheets

(52) U.S. Cl.
CPC ............ *G09G 2300/0408* (2013.01); *G09G 2300/0426* (2013.01)

(56) References Cited

U.S. PATENT DOCUMENTS

| | | | | |
|---|---|---|---|---|
| 2011/0193831 A1* | 8/2011 | Kunimori | ............ | G11C 19/184 345/204 |
| 2012/0068994 A1* | 3/2012 | Li | ........................ | G09G 3/3677 345/213 |
| 2014/0292628 A1* | 10/2014 | Park | ..................... | G09G 3/3677 345/100 |
| 2015/0016584 A1* | 1/2015 | Dun | ........................ | G11C 27/04 377/68 |

* cited by examiner

GATE DRIVE CIRCUIT, CASCADE GATE DRIVE CIRCUIT AND METHOD FOR DRIVING CASCADE GATE DRIVE CIRCUIT

CROSS REFERENCE TO RELATED APPLICATION

The present application claims the priority to Chinese Patent Application No. 201510718070.5, titled "GATE DRIVE CIRCUIT, CASCADE GATE DRIVE CIRCUIT AND METHOD FOR DRIVING CASCADE GATE DRIVE CIRCUIT", filed on Oct. 29, 2015 with the State Intellectual Property Office of People's Republic of China, which is incorporated herein by reference in its entirety.

FIELD

The present disclosure relates to the technical field of gate drive circuit, and in particular to a gate drive circuit, a cascade gate drive circuit and a method for driving the cascade gate drive circuit.

BACKGROUND

In the conventional technology, there are normally multiple data lines and multiple gate lines (or referred to as scanning lines) cross with the date lines in a display region of a touch display panel. Furthermore, touch electrodes of the touch display panel in the display region have different shapes according to different touch-control types. For example, referring to FIG. 1, in a display region (not shown in FIG. 1) of a touch display panel, there are multiple data lines d1 to d8 and multiple scanning lines s1 to s6, together with multiple touch electrodes pad1 to pad4. Normally, the touch electrodes pad1 to pad4 cover the multiple scanning lines and data lines in the whole display region of the touch display panel. It should be noted that FIG. 1 only schematically shows a simple structure of the touch display panel without limiting the quantities of the scanning lines, data lines and touch electrodes.

In the conventional technology, parasitic capacitors exist between the touch electrode and the scanning line, between the touch electrode and the data line, and between adjacent touch electrodes. For example, in a design shown in FIG. 1, a parasitic capacitor C1 exists in a position where the touch electrode pad1 overlaps with the scanning line s1 in vertical direction, and parasitic capacitor C2 exists in a position where the touch electrode pad3 overlaps with the data line d1 in vertical direction. The presence of the parasitic capacitors C1 and C2 is equivalent to extra load capacitors exerted on the touch electrodes, thereby increasing the overall load of the touch display panel. Parasitic capacitor C3 exists between adjacent touch electrodes pad1 and pad2. Due to the parasitic capacitor C3, touch detection on one touch electrode will be interfered by an adjacent touch electrode and the touch-control accuracy will be reduced.

SUMMARY

In view of the above defects in the conventional technology, the following technical solutions are provided according to the present disclosure.

There is provided a gate drive circuit, including a driving transistor and a switch transistor. A gate electrode of the switching transistor is configured to receive a first switching signal, a first electrode of the switching transistor is configured to receive a second switching signal, a second electrode of the switching transistor is electrically connected to a gate electrode of the driving transistor, a first electrode of the driving transistor is configured to receive a first control signal, and a second electrode of the driving transistor is electrically connected to an output terminal.

During a display period, the first control signal is a display scanning signal, the first switching signal switches the switching transistor off, the driving transistor is switched on upon reception of a display switching signal, and the driving transistor outputs the display scanning signal. During a touch-control period, the first control signal is a touch scanning signal, the first switching signal switches the switching transistor on, the second switching signal switches the driving transistor on, and the driving transistor outputs the touch scanning signal.

According to the present disclosure, there is further provided a cascade gate drive circuit, including multiple gate drive circuits as described previously.

According to the present disclosure, there is further provided a method for driving the cascade gate drive circuit as described previously, where the a duration of one frame includes a display period and a touch-control period that are continuous to each other. During the display period, the multiple gate drive circuits are scanned successively to output the display scanning signals sequentially. During the touch-control period, the multiple gate drive circuits are scanned simultaneously to output the touch scanning signal simultaneously.

According to the present disclosure, there is further provided a cascade gate drive circuit, further including multiple gate drive sub-circuits.

The cascade gate drive circuit includes multiple gate drive circuit groups, where each of the gate drive circuit groups includes at least one gate drive circuit scanned successively, and one gate drive sub-circuit is arranged between any two adjacent gate drive circuit groups.

According to the present disclosure, there is further provided a method for driving the cascade gate drive circuit as described previously. A duration of one frame includes multiple repeated groups of continuous display periods, suspension periods and touch-control periods. During the display period, at least one gate drive circuit in the gate drive circuit groups is scanned successively, and the gate drive circuit outputs the display scanning signal sequentially. After the last gate drive circuit in the gate drive circuit group is scanned, the suspension period is entered, and during the suspension period, the scanning is stopped at the gate drive sub-circuit next to the last gate drive circuit in the gate drive circuit group. During the touch-control period, all of the gate drive circuits in all of the gate drive circuit groups are scanned simultaneously and output the touch scanning signals simultaneously. After the touch-control period ends, during the immediately next display period, the gate drive sub-circuit at which the scanning was stopped in the suspension period starts to output the display scanning signals.

BRIEF DESCRIPTION OF THE DRAWINGS

The drawings needed to be used in the description of the embodiments will be described briefly as follows, so that the technical solutions according to the embodiments of the present disclosure will become clearer. It is obvious that the drawings in the following description are only some embodiments of the present disclosure. For those skilled in the art, other drawings may be obtained according to these drawings without any creative work.

DETAILED DESCRIPTION OF EMBODIMENTS

The technical solution according to the embodiments of the present disclosure will be described clearly and completely as follows in conjunction with the drawings in the embodiments of the present disclosure. It is obvious that the described embodiments are only a few of the embodiments according to the present disclosure. Any other embodiments obtained by those skilled in the art based on the embodiments in the present disclosure without any creative work fall into the scope of the present disclosure.

Figure 2:
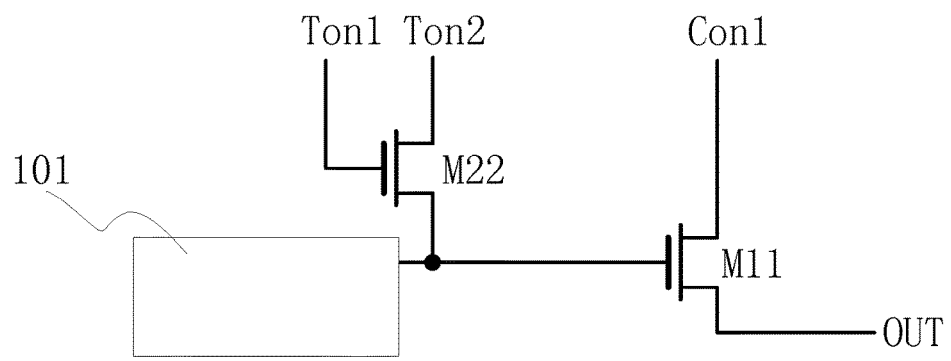
FIG. 2 shows a gate drive circuit according to an embodiment of the present disclosure.

Referring to FIG. 2, a gate drive circuit according to an embodiment of the present disclosure is shown, including a driving transistor M11 and a switching transistor M22. A gate electrode of the switching transistor M22 is configured to receive a first switching signal Ton1, a first electrode of the switching transistor M22 is configured to receive a second switching signal Ton2, a second electrode of the switching transistor M22 is electrically connected to a gate electrode of the driving transistor M11, a first electrode of the driving transistor M11 is configured to receive a first control signal Con1, and a second electrode of the driving transistor M11 is electrically connected to an output terminal OUT.

During a display period, the first control signal Con1 is a display scanning signal, the first switching signal Ton1 controls to switch off the switching transistor M22, the driving transistor M11 is switched on upon reception of a display switching signal, and the display scanning signal Con1 is transmitted to the output terminal OUT via the driving transistor M11. In other words, during the display period, the output terminal OUT outputs the display scanning signal. The display scanning signal comes from an output circuit 101 of the gate drive circuit except for the driving transistor M11 and the switching transistor M22, for controlling to switch on the driving transistor during the display period, in order to ensure the driving transistor to output the display scanning signal Con1 during the display period. The output circuit 101 may include one or more transistors and one or more capacitors. The specific structure of output circuit 101 is not intended to limited to the structure shown in this figure. It should be understood that the structure of output circuit 101 may be any structure as long as the output circuit 101 can output the display switching signal to the gate electrode of the driving transistor M11 during the display period.

During a touch-control period, the first control signal Con1 is a touch scanning signal, the first switching signal Ton1 switches on the switching transistor M22, and the second switching signal Ton2 is transmitted to the gate electrode of the driving transistor M11 via the switching transistor M22 to switch on the driving transistor M11. Thus, the touch scanning signal Con1 is transmitted to the output terminal OUT via the driving transistor M11, i.e., the output terminal OUT outputs the touch scanning signal during the touch-control period.

Figure 1:
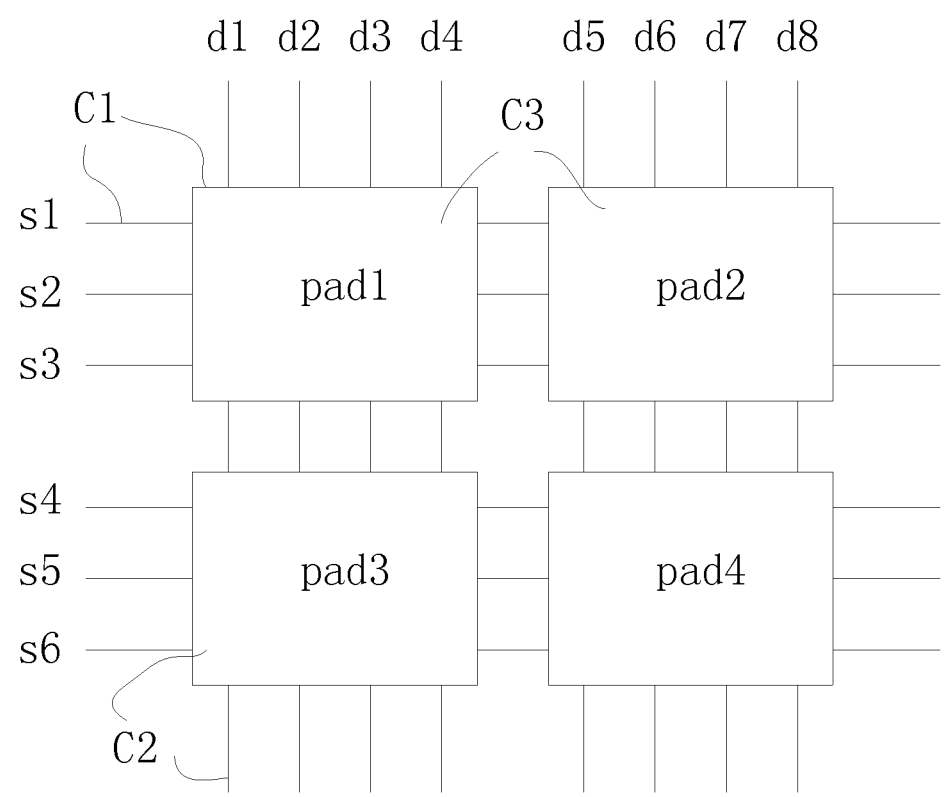
FIG. 1 is a schematic structural diagram of a display region of a touch display panel in the conventional technology.

It should be noted that, in the gate drive circuit shown in FIG. 1, the driving transistor M11 and the switching transistor M22 are both N-type transistors. Thus, in this case, during the display period, the first switching signal Ton1, which switches off the switching transistor M22, is a low level signal, and the display signal, which switches on the driving transistor M11, is a high level signal; and during the touch-control period, the first switching signal Ton1, which switches on the switching transistor M22, is a high level signal, and the second switching signal Ton2, which switches g on the driving transistor M11, is a high level signal. However, the types of the driving transistor M11 and the switching transistor M22, and the signals switching the driving transistor M11 or the switching transistor M22 on or off are not limited thereto. In other words, the driving transistor M11 and the switching transistor M22 can both be P-type transistors, or alternatively one of the driving transistor M11 and the switching transistor M22 is a P-type transistor and the other is a N-type transistor. Correspondingly, the signals switching the driving transistor M11 or the switching transistor M22 on or off may be adjusted according to the types of the transistors, as long as it is ensured that, during the display period, the first switching signal Ton1 switches off the switching transistor M22, the driving transistor M11 is switched on upon reception of a display switching signal, and the display scanning signal Con1 is transmitted to the output terminal OUT via the driving transistor M11, i.e., the output terminal OUT outputs the display scanning signal; and as long as it is ensured that during the touch-control period, the first control signal Con1 is a touch scanning signal, the first switching signal Ton1 switches on the switching transistor M22, and the second switching signal Ton2 is transmitted to the gate electrode of the driving transistor M11 via the switching transistor M22 to switch on the driving transistor M11, and the touch scanning signal Con1 is transmitted to the output terminal OUT via the driving transistor M11, i.e., the output terminal OUT outputs the touch scanning signal, which will not be described specifically.

Figure 3:
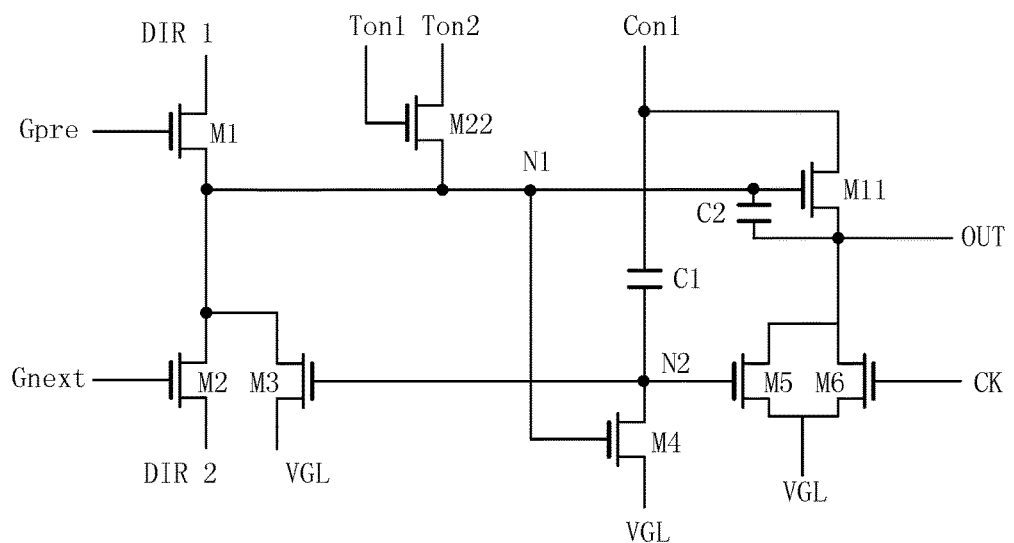
FIG. 3 shows a gate drive circuit according to an embodiment of the present disclosure.

FIG. 3 shows a gate drive circuit according to an embodiment of the present disclosure. The gate drive circuit includes: a driving transistor M11, a switch transistor M22, a first transistor M1, a second transistor M2, a third transistor M3, a fourth transistor M4, a fifth transistor M5, a sixth transistor M6, a first capacitor C1 and a second capacitor C2. Specifically, a gate electrode of the driving transistor M11 is electrically connected to a first node N1, a first electrode of the driving transistor M11 is configured to receive a first control signal Con1, and a second electrode of the driving transistor M11 is electrically connected to an output terminal OUT. A gate electrode of the switching transistor M22 is configured to receive a first switching signal Ton1, a first electrode of the switching transistor M22 is configured to receive a second switching signal Ton2, and a second electrode of the switching transistor M22 is electrically connected to a gate electrode of the driving transistor M11. A gate electrode of the first transistor M1 is configured to receive a first switch-on signal Gpre, a first electrode of the first transistor M1 is configured to receive a first power supply signal DIR1, and a second electrode of the first transistor M1 and the gate electrode of the driving transistor M11 are both electrically connected to the first node N1. A gate electrode of the second transistor M2 is configured to receive a second switch-on signal Gnext, a first electrode of the second transistor M1 is configured to receive a second power supply signal DIR2, and a second electrode of the second transistor M1 and the gate electrode of the driving transistor M11 are both electrically connected to the first node N1. A gate electrode of the third transistor M3 and a gate electrode of the fifth transistor M5 are both connected to a second node N2, a first electrode of the third transistor M3 is configured to receive a first constant potential signal VGL, and a second electrode of the third transistor M3 is electrically connected to the first node N1. A gate electrode of the fourth transistor M4 is electrically connected to the first node N1, a first electrode of the fourth transistor M4 is configured to receive the first constant potential signal VGL, and a second electrode of the fourth transistor M4 is electrically connected to the second node N2. A first electrode of the fifth transistor M5 is configured to receive the first constant potential signal VGL, and a second electrode of the fifth transistor M5 is electrically connected to the output terminal OUT. A gate electrode of the sixth transistor M6 is configured to receive a first clock signal CK, a first electrode of the sixth transistor M6 is configured to receive the first constant potential signal VGL, and a second electrode of the sixth transistor M6 is electrically connected to the output terminal OUT. A first electrode of the first capacitor C1 is configured to receive the first control signal Con1, and a second electrode of the first capacitor C1 is electrically connected to the second node N2. A first electrode of the second capacitor C2 is electrically connected to the first node N1, and a second electrode of the second capacitor C2 is electrically connected to the output terminal OUT.

It should be noted that, the gate drive circuit shown in FIG. 3 is normally arranged in a non-display region around a display region of a touch display panel. The display region of the touch display panel generally includes multiple touch electrodes and multiple touch signal leads electrically connected to the touch electrodes. The touch electrodes receive touch driving signals through the touch signal leads. In general, the touch driving signals are provided by an integrated circuit (IC). The touch electrodes receive the touch driving signals to detect whether a touch occurs. As mentioned when describing the conventional technology, during a touch-control period, the touch electrodes in the display region of the touch display panel, upon reception of the touch driving signals from the integrated circuit (IC), form parasitic capacitors with gate lines and scanning lines adjacent to (overlapping in the vertical direction with) the touch electrodes. The gate drive circuit, which is arranged in the non-display region of the touch display panel, has the output terminals OUTs electrically connected with the gate lines in the display region of the touch display panel in a one-to-one correspondence. During a display period, the first control signal Con1 is a display scanning signal, the first switching signal Ton1 controls to switch off the switching transistor M22, a first switch-on signal Gpre switches on the first transistor M1, the first power supply signal DIR1 is transmitted to the gate electrode of the driving transistor M11 via the first transistor M1, to switch on the driving transistor M11. Thus, the display scanning signal Con1 is transmitted to the output terminal OUT via the driving transistor M11. In other words, during the display period, the output terminal OUT outputs the display scanning signal. The display scanning signal is transmitted to a gate line in the display region that is electrically connected to the gate drive circuit in a one-to-one correspondence, and the scan on the gate line is started. During a touch-control period, the first control signal Con1 is a touch scanning signal, the first switching signal Ton1 switches on the switching transistor M22, the second switching signal Ton2 is transmitted to the gate electrode of the driving transistor M11 via the switching transistor M22, to switch on the driving transistor M11. Thus, the touch scanning signal Con1 is transmitted to the output terminal OUT via the driving transistor M11. In other words, during the touch-control period, the output terminal OUT of the gate drive circuit outputs the touch scanning signal Con1. The touch scanning signal is transmitted to a gate line in the display region that is electrically connected to the gate drive circuit in a one-to-one correspondence, but the gate line is not scanned during the touch-control period. An advantage of this design lies in that, since the gate line is configured to receive the touch scanning signal during the touch-control period, the load between the gate line and a touch electrode, which is adjacent to (overlapping in the vertical direction with) the gate line and is configured to receive the touch driving signal, is reduced.

In some embodiments, a phase and a frequency of the touch scanning signal received by the gate line from the gate drive circuit are respectively the same as those of the touch driving signal received by the touch electrode from the integrated circuit (IC), while an amplitude of the touch scanning signal received by the gate line from the gate drive circuit is less than or equal to that of the touch driving signal received by the touch electrode from the integrated circuit (IC). Therefore, with the gate drive circuit according to the embodiment of the present disclosure as shown in FIG. 3, it is possible to transmit a touch scanning signal having the same phase and frequency as those of the touch driving signal received by the touch electrode in the display region of the touch display panel and an amplitude equal to or less than that of the touch driving signal during the touch-control period, reducing the load on the touch electrode.

In some embodiments, during the touch-control period, the touch scanning signal may be the same signal as the first constant potential signal VGL. In this case, with the gate drive circuit according to the embodiment of the present disclosure as shown in FIG. 3, the output terminal OUT of the gate drive circuit transmits a low level signal to a gate line in the display region of the touch display panel during the touch-control period, thereby switching off a switching transistor of each pixel unit in the display region. Thus, the potential on the switching transistor connected to the gate line is protected from being effected when the touch electrode in the display region adjacent to (overlapping in the vertical direction with) the gate line is configured to receive the touch driving signal, further improving the display effect.

In some embodiments, the first control signal Con1 may be a square wave signal in inverse phase to the first clock signal CK.

Figure 4A:
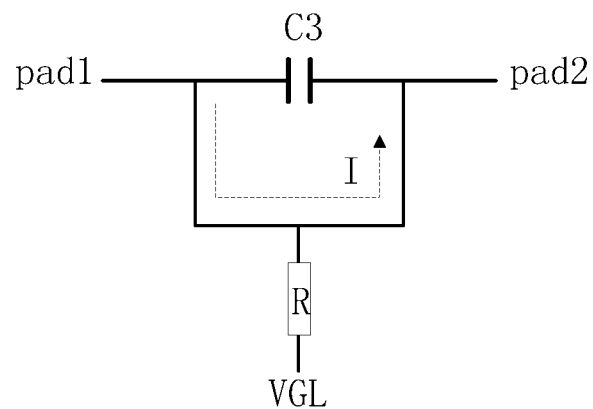
FIG. 4A and FIG. 4B are schematic circuit diagrams showing an effect exerted on a coupling circuit consisting of adjacent touch electrodes by the magnitude of on-resistance of a transistor.
Figure 4B:
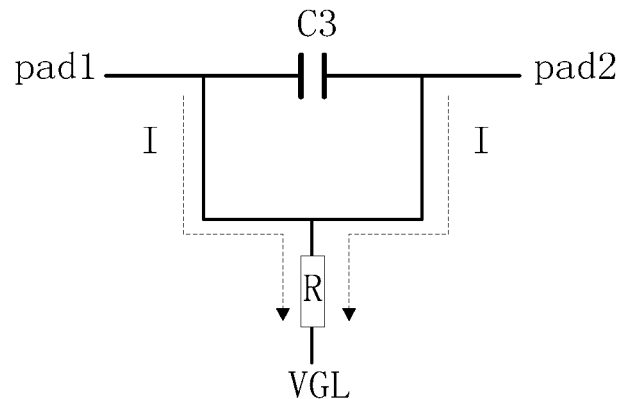

In some embodiments, in the gate drive circuit according to the embodiment of the present disclosure as shown in FIG. 3, a channel width-to-length ratio of the driving transistor M11 may be larger than that of any one of the first transistor M1, the second transistor M2, the third transistor M3, the fourth transistor M4, the fifth transistor M5, and the sixth transistor M6. An advantage of this design lies in that the on-resistance of the driving transistor M11 depends on the channel width-to-length ratio of the driving transistor M11, in other words, if the channel width-to-length ratio is larger, then the on-resistance is less, and the time-delay of inputting signals is reduced more. Referring to FIG. 4A and FIG. 4B, an effect exerted on a coupling circuit consisting of adjacent touch electrodes by the magnitude of on-resistance of a transistor is shown in schematic circuit diagrams. In FIG. 4A and FIG. 4B, the driving transistor M11 equals to a resistor R, and coupling capacitor C3 is formed between two adjacent touch electrodes pad1 and pad2. FIG. 4A shows a case that the channel width-to-length ratio of the driving transistor M11 is relatively small. Specifically, in the case that the channel width-to-length ratio of the driving transistor M11 is relatively small, the on-resistance of the driving transistor M11 is large, and thus the current I tends to flow between the two adjacent touch electrodes pad1 and pad2, hence a coupling circuit tends to be formed between the two adjacent touch electrodes pad1 and pad2, increasing the coupling capacitance C3. FIG. 4B shows a case that the channel width-to-length ratio of the driving transistor M11 is relatively large. Specifically, in the case that the channel width-to-length ratio of the driving transistor M11 is relatively large, the on-resistance of the driving transistor M11 is small, and thus the current I tends to flow through the path where the driving transistor M11 resides, hence a coupling circuit does not tend to be formed between the two adjacent touch electrodes pad1 and pad2, decreasing the coupling capacitance C3.

Figure 5:
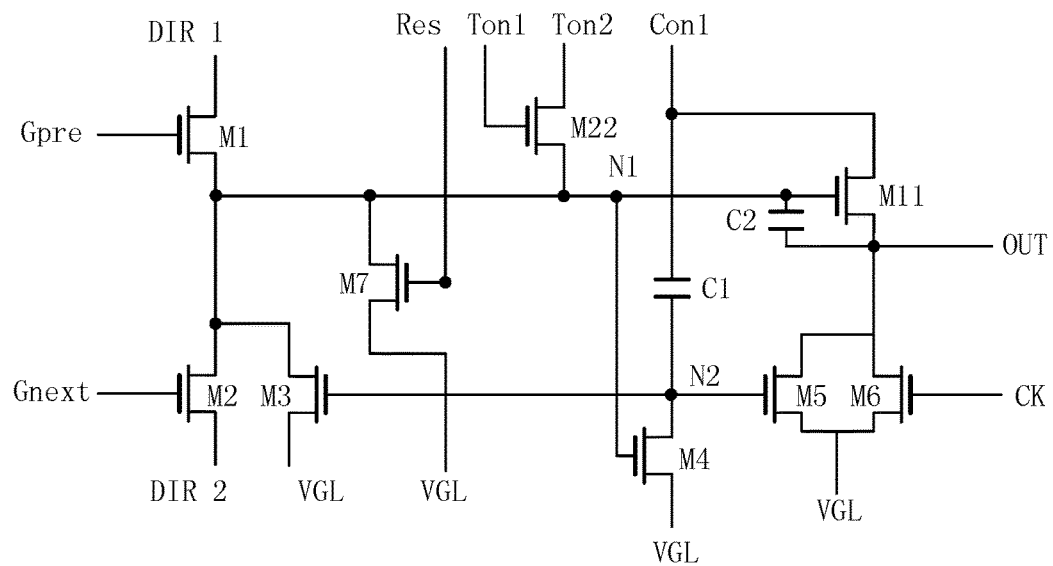
FIG. 5 shows a gate drive circuit according to an embodiment of the present disclosure.

FIG. 5 shows a gate drive circuit according to an embodiment of the present disclosure. Most part of the gate drive circuit in FIG. 5 is the same as the gate drive circuit in FIG. 3, and thus reference may be made to the description of the embodiment of FIG. 3, which will not be repeated herein. The difference from the embodiment of FIG. 3 lies in that the gate drive circuit according to the embodiment of the present disclosure as shown in FIG. 5 further includes a seventh transistor M7. A gate electrode of the seventh transistor M7 is configured to receive a reset signal Res, a first electrode of the seventh transistor M7 is configured to receive the first constant potential signal VGL, and a second electrode of the seventh transistor M7 is electrically connected to the first node N1. When the seventh transistor M7 is switched on upon reception of the reset signal Res on the gate electrode, the first constant potential signal VGL at low level may be transmitted to the first node via the seventh transistor M7. An advantage of this design lies in that, the potential at the first node may be "updated" (reset) by introducing the seventh transistor M7. In other words, when the gate drive circuit needs to restart, the driving transistor M11 may be switched off completely by means of the seventh transistor M7 and the signal received via the seventh transistor M7, preventing a surplus signal from being transmitted to the output terminal OUT via the driving transistor M11, and thus preventing abnormal display due to the electric leakage of a pixel caused when the gate line connected to the output terminal OUT is configured to receive the surplus signal.

Figure 6:
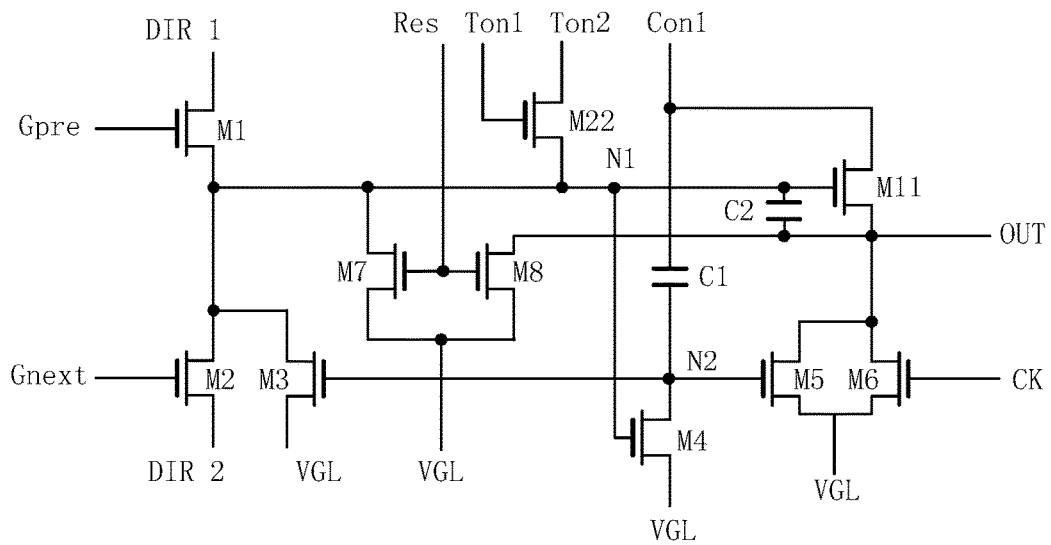
FIG. 6 shows another gate drive circuit according to an embodiment of the present disclosure.

FIG. 6 shows another gate drive circuit according to an embodiment of the present disclosure. Most part of the gate drive circuit in FIG. 6 is the same as the gate drive circuit in FIG. 5, and thus reference may be made to the description of the embodiments of FIGS. 3 and 5, which will not be repeated herein. The difference from the embodiment of FIG. 5 lies in that the gate drive circuit according to the embodiment of the present disclosure as shown in FIG. 6 further includes an eighth transistor M8. A gate electrode of the eighth transistor M8 is configured to receive the reset signal Res, a first electrode of the eighth transistor M8 is configured to receive the first constant potential signal VGL, and a second electrode of the eighth transistor M8 is electrically connected to the output terminal OUT. When the eighth transistor M8 is switched on upon reception of the reset signal Res on the gate electrode, the first constant potential signal VGL at low level may be transmitted to the first node via the eighth transistor M8. An advantage of this design lies in that, the potential at the output terminal OUT may be "updated" (reset) by introducing the eighth transistor M8, the low potential signal VGL is transmitted to the output terminal OUT via the eighth transistor M8, and thus is transmitted to the gate line connected to the output terminal OUT, thereby switching off multiple pixel units in the display region connected to the gate line, and thus preventing abnormal display due to the electric leakage of pixels.

Figure 7:
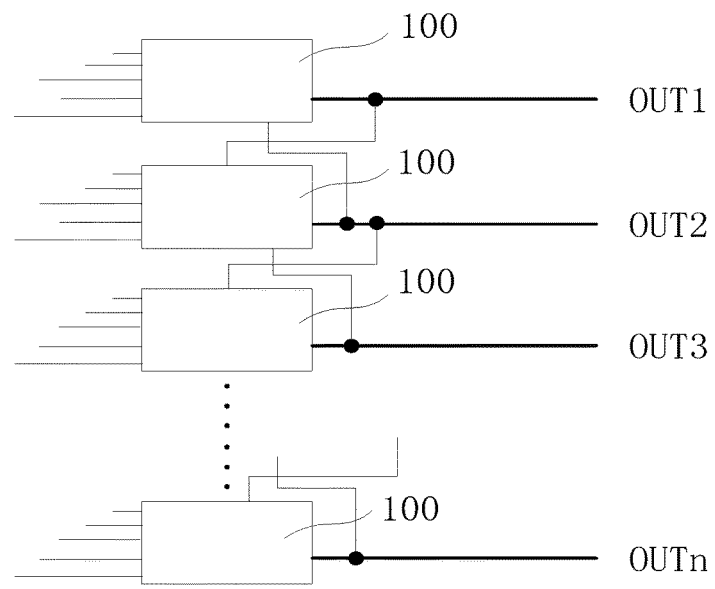
FIG. 7 shows a cascade gate drive circuit according to an embodiment of the present disclosure.

FIG. 7 shows a cascade gate drive circuit according to an embodiment of the present disclosure. The cascade gate drive circuit includes multiple (n) cascaded gate drive circuits 100. in some embodiments, the gate drive circuit 100 at each stage may have a circuit structure as provided in any one of the embodiments shown in FIGS. 2, 3, 5 and 6, and the specific connection will not be repeated herein. In other words, each of the gate drive circuits in FIG. 7 is configured to receive a first switching signal Ton1, a second switching signal Ton2, a first control signal Con1, a first clock signal CK, a first constant potential signal VGL, a first power supply signal DIR1 and a second power supply DIR2. Furthermore, the gate drive circuit 100 at the first stage further is configured to receive an initiating signal IN. In some embodiments, a gate drive circuit may further receive a reset signal Res. Regarding the multiple gate drive circuits 100 in the cascade gate drive circuit, an output signal of a gate drive circuit at a preceding stage serves as a first switch-on signal Gpre of a gate drive circuit at a next stage, and an output signal of the gate drive circuit at the next stage serves as a second switch-on signal Gnext of the gate drive circuit the preceding stage; ports for receiving the first control signal Con1 and ports for receiving the first clock signal CK are arranged alternately in the gate drive circuits at adjacent stages; and the output terminals OUT1 to OUTn of the multiple (n) gate drive circuits are electrically connected to the gate lines in the display region of the touch display panel, respectively.

Figure 8:
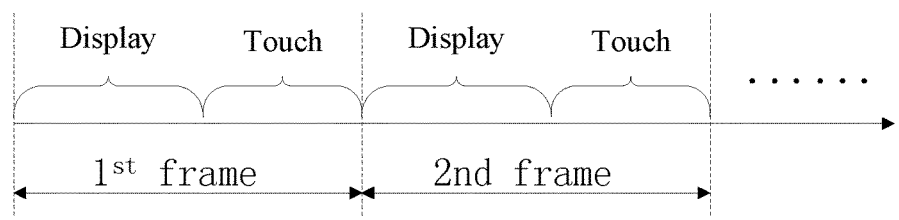
FIG. 8 shows a driving mode according to an embodiment of the present disclosure.

FIG. 8 shows a driving mode according to an embodiment of the present disclosure, which is adaptive to the cascade gate drive circuit according to the embodiment of the present disclosure as shown in FIG. 7. Referring to FIG. 7 and FIG. 8 collectively, in this driving mode, the duration of one frame includes a display period Display and a touch-control period Touch that are continuous to each other. During the display period Display, the multiple gate drive circuits 100 are scanned sequentially and successively, and the output terminals OUT1 to OUTn output the display scanning signals sequentially. During the touch-control period Touch, the multiple gate drive circuits 100 are scanned simultaneously, and the output terminals OUT1 to OUTn output the touch scanning signal simultaneously. With the drive mode according to the embodiment of the present disclosure as shown in FIG. 8, display scanning signals may be transmitted to the gate lines in the display region of the touch display panel via the cascade gate drive circuit during the display period, and touch scanning signals may be transmitted to the gate lines in the display region of the touch display panel via the cascade gate drive circuit during the touch-control period, whereby reducing the load between the gate lines and touch electrodes which are adjacent to (overlapping in the vertical direction with) the gate lines and receive the touch driving signal.

Figure 9:
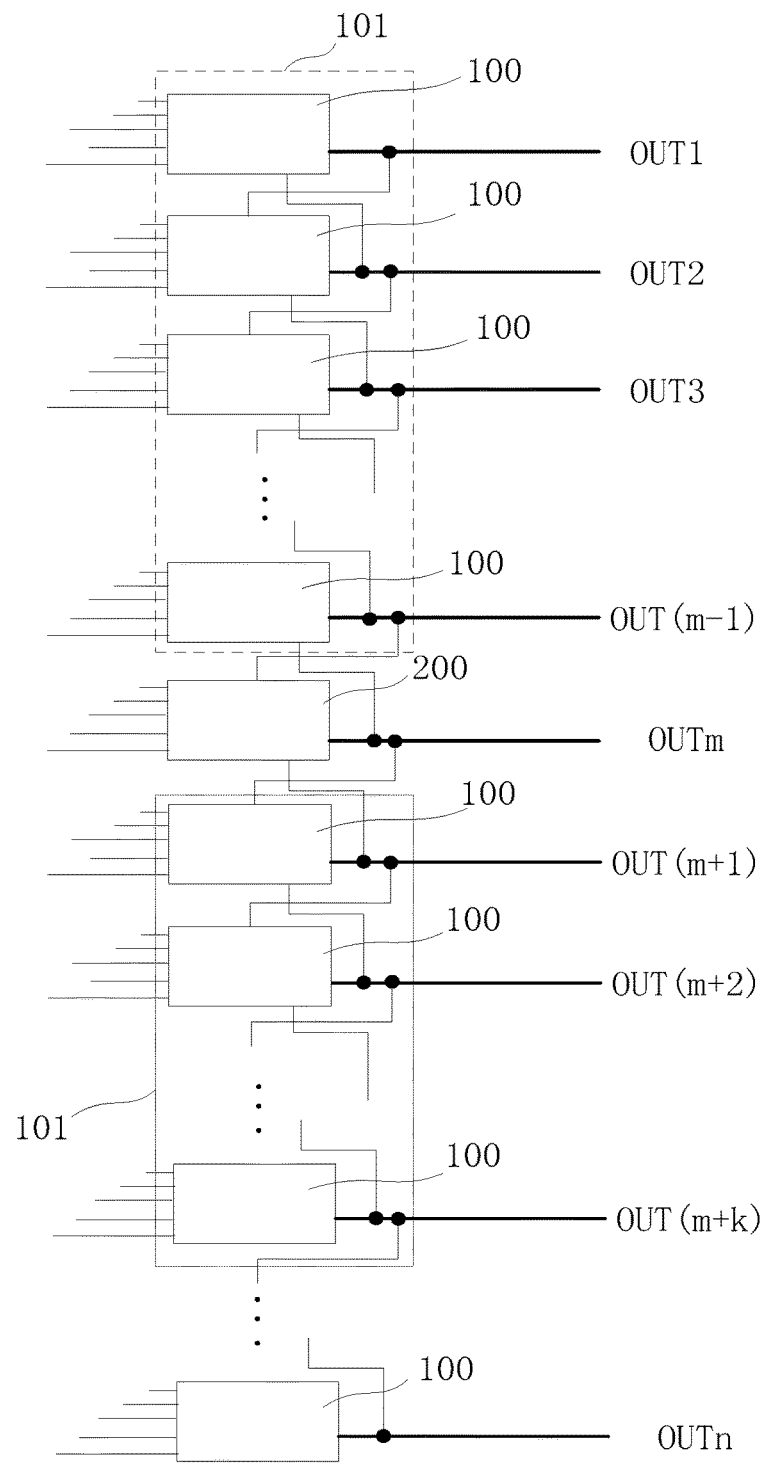
FIG. 9 shows another cascade gate drive circuit according to an embodiment of the present disclosure.

FIG. 9 shows another cascade gate drive circuit according to an embodiment of the present disclosure. The cascade gate drive circuit includes multiple cascaded gate drive circuits 100 and at least one gate drive sub-circuit 200 cascaded with the gate drive circuits 100. The gate drive circuit 100 at each stage may have a specific circuit structure as provided in any one of the embodiments shown in FIGS. 2, 3, 5 and 6, and the specific circuit and connection will not be repeated herein. In other words, each of the gate drive circuits in FIG. 9 is configured to receive a first switching signal Ton1, a second switching signal Ton2, a first control signal Con1, a first clock signal CK, a first constant potential signal VGL, a first power supply signal DIR1 and a second power supply DIR2. Furthermore, the gate drive circuit 100 at the first stage further is configured to receive an initiating signal IN. In some embodiments, a gate drive circuit 100 may be further configured to receive a reset signal Res. Regarding the multiple gate drive circuits 100 in the cascade gate drive circuit, an output signal of a gate drive circuit at a preceding stage serves as a first switch-on signal Gpre of a gate drive circuit at a next stage, and an output signal of the gate drive circuit at the next stage serves as a second switch-on signal Gnext of the gate drive circuit at the preceding stage; ports for receiving the first control signal Con1 and ports for receiving the first clock signal CK are arranged alternately in the gate drive circuits at adjacent stages; and the output terminals of the gate drive circuits 100 are electrically connected to the gate lines in the display region of the touch display panel, respectively.

Figure 10:
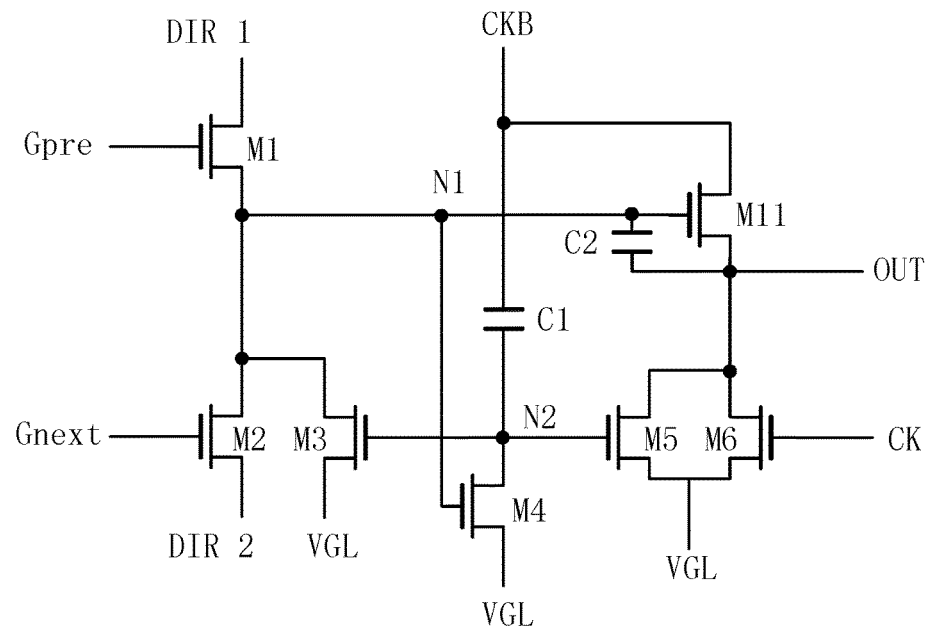
FIG. 10 shows a gate drive sub-circuit according to an embodiment of the present disclosure.

FIG. 10 shows a gate drive sub-circuit 200 according to an embodiment of the present disclosure, which has a similar structure as the gate drive circuit 100. For understanding the specific circuit structure and connection, reference may be made to any one of embodiments according to the present disclosure as shown in FIGS. 2, 3, 5 and 6, which is be repeated. The main difference lies in that the gate drive sub-circuit 200 does not include the switching transistor M22 in any one of the embodiments according to the present disclosure as shown in FIGS. 2, 3, 5 and 6.

Referring to FIG. 9, the cascade gate drive circuit according to the embodiment includes multiple gate drive circuit groups 101. A first gate drive circuit group 101 includes the first stage gate drive circuit 100 to the (m−1)-th stage gate drive circuit 100, a second gate drive circuit group 101 includes the (m+1)-th stage gate drive circuit 100 to the (m+k)-th stage gate drive circuit 100, and one gate drive sub-circuit 200 is included between two adjacent gate drive circuit groups 101, where m and k are both positive integers greater than 1 and less than n. The output terminals OUT1 to OUTn of the gate drive circuits and the gate drive sub-circuit are electrically connected to the gate lines in the display region of the touch display panel, respectively. It should be noted that, although only two gate drive circuit groups 101 and the one gate drive sub-circuit 200 between the two gate drive circuit groups 101 are shown in FIG. 9, the technical solution is not limited thereto. The structure may be designed to include multiple gate drive circuit groups and multiple gate drive sub-circuits, as long as it is ensured that one gate drive sub-circuit is includes between any two adjacent gate drive circuit groups.

Figure 11:
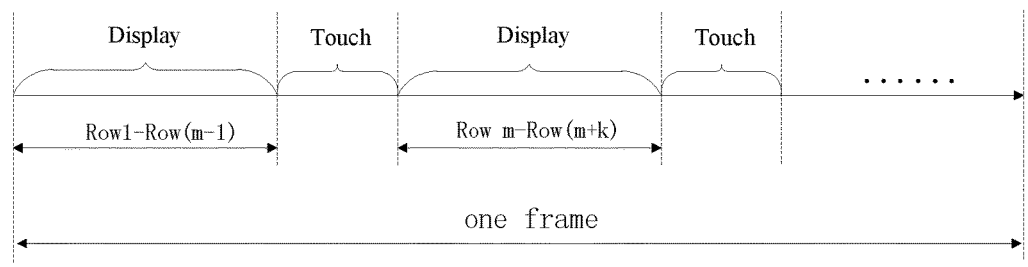
FIG. 11 shows another driving mode according to an embodiment of the present disclosure.

FIG. 11 shows another driving mode according to an embodiment of the present disclosure, which is adaptive to the cascade gate drive circuit according to the embodiment as shown in FIG. 9. Referring to FIG. 9 and FIG. 11 collectively, in the driving mode, the duration of one frame includes multiple continuous display periods Display, suspension periods (not shown in FIG. 11) and touch-control periods Touch. During the display period Display, the first stage gate drive circuit 100 to the (m−1)-th stage gate drive circuit 100 in the first gate drive circuit group 101 are scanned sequentially, and the output terminals OUT1 to OUT(m−1) of the gate drive circuits 100 output display scanning signals sequentially. After the last gate drive circuit 100 (i.e., the (m−1)-th stage gate drive circuit) of the first gate drive circuit group 101 is scanned, the suspension period is entered, during which the scanning is stopped at the gate drive sub-circuit 200. However, regarding the cascade gate drive circuit according to the embodiments of the present disclosure, an output signal of a preceding stage gate drive circuit serves as a first switch-on signal Gpre of a next stage gate drive circuit, and an output signal of the next stage gate drive circuit serves as a second switch-on signal Gnext of the preceding stage gate drive circuit. Therefore, in the embodiment in FIG. 9, after the (m−1)-th stage gate drive circuit is scanned, the first node N1 in the m-th stage gate drive sub-circuit 200 has been pre-charged to a voltage, which remains at the first node N1 during the suspension period. During the touch-control period Touch, all of the gate drive circuits 100 in all of the gate drive circuit groups 101 are scanned simultaneously, the work principle of the gate drive circuits 100 may be the same as that in the embodiment shown in FIG. 3 and will not be repeated herein, and output terminals corresponding to all of the gate drive circuits 100 output touch scanning signals simultaneously. After the touch-control period ends, during the immediately next display period Display, because the first node N1 in the m-th stage gate drive sub-circuit 200 at which the scanning is stopped during the suspension period has been pre-charged to a voltage, the scanning in the cascade gate drive circuit now starts from the m-th stage gate drive sub-circuit, and the output terminals starting from the m-th stage output display scanning signals sequentially. From the m-th stage gate drive sub-circuit to the $n^{th}$ stage gate drive circuit, optionally, there may be multiple display periods Display, suspension periods and touch-control periods Touch, which may be designed according to product requirements and is not limited herein. Through the cascade gate drive circuit according to the embodiment as shown in FIG. 9, display scanning signals may be transmitted to the gate lines which are arranged in the display region and are connected to the gate drive circuits and the gate drive sub-circuits in a one-to-one correspondence via the output terminals of the gate drive circuits and the gate drive sub-circuits during the display period, and touch scanning signals may be transmitted to the gate lines which are arranged in the display region and are connected to the gate drive circuits in a one-to-one correspondence via the output terminals of the gate drive circuits during the display period, thereby reducing the load between gate lines and touch electrodes which are adjacent to (overlapping in the vertical direction with) the gate lines and receive the touch driving signal.

In the above, a gate drive circuit, a cascade gate drive circuit and a method for driving the cascade gate drive circuit are described in details. Although specific embodiments are described for explaining the principle and implementation of the present invention, the description of the embodiments is only for facilitating understanding the idea and core of the present disclosure. For those skilled in the art, modification may be made to the specific embodiment and application according to the spirit of the present of the present disclosure. In summary, the description is not to be interpreted as limitation to the present invention.

The invention claimed is:

1. A gate drive circuit, comprising a driving transistor and a switching transistor, wherein
the switching transistor comprises a gate electrode, a first electrode, and second electrode, wherein
the gate electrode is configured to receive a first switching signal,
the first electrode of the switching transistor is configured to receive a second switching signal, and
the second electrode of the switching transistor is electrically connected to a gate electrode of the driving transistor; and
the driving transistor comprises a first electrode and a second electrode, wherein
the first electrode of the driving transistor is configured to receive a first control signal, and
the second electrode of the driving transistor is electrically connected to an output terminal; and, wherein
during a display period, the first control signal is a display scanning signal, the first switching signal switches the switching transistor off, the driving transistor is switched on upon reception of a display switching signal, and the driving transistor outputs the display scanning signal; and
during a touch-control period, the first control signal is a touch scanning signal, the first switching signal switches the switching transistor on, the second switching signal switches the driving transistor on, and the driving transistor outputs the touch scanning signal.

2. The gate drive circuit according to claim 1, further comprising a first transistor, a second transistor, a third transistor, a fourth transistor, a fifth transistor, a sixth transistor, a first capacitor and a second capacitor, wherein
a gate electrode of the first transistor is configured to receive a first switch-on signal, a first electrode of the first transistor is configured to receive a first power supply signal, and a second electrode of the first transistor and the gate electrode of the driving transistor are both electrically connected to a first node;
a gate electrode of the second transistor is configured to receive a second switch-on signal, a first electrode of the second transistor is configured to receive a second power supply signal, and a second electrode of the second transistor and the gate electrode of the driving transistor are both electrically connected to the first node;
a gate electrode of the third transistor and a gate electrode of the fifth transistor are both connected to a second node, a first electrode of the third transistor is configured to receive a first constant potential signal, and a second electrode of the third transistor is electrically connected to the first node;
a gate electrode of the fourth transistor is electrically connected to the first node, a first electrode of the fourth transistor is configured to receive the first constant potential signal, and a second electrode of the fourth transistor is electrically connected to the second node;
a first electrode of the fifth transistor is configured to receive the first constant potential signal, and a second electrode of the fifth transistor is electrically connected to the output terminal;

a gate electrode of the sixth transistor is configured to receive a first clock signal, a first electrode of the sixth transistor is configured to receive the first constant potential signal, and a second electrode of the sixth transistor is electrically connected to the output terminal;
a first electrode of the first capacitor is configured to receive the first control signal, and a second electrode of the first capacitor is electrically connected to the second node; and
a first electrode of the second capacitor is electrically connected to the first node, and a second electrode of the second capacitor is electrically connected to the output terminal.

3. The gate drive circuit according to claim 2, further comprising a seventh transistor, wherein
a gate electrode of the seventh transistor is configured to receive a reset signal, a first electrode of the seventh transistor is configured to receive the first constant potential signal, and a second electrode of the seventh transistor is electrically connected to the first node.

4. The gate drive circuit according to claim 3, further comprising an eighth transistor, wherein
a gate electrode of the eighth transistor is configured to receive the reset signal, a first electrode of the eighth transistor is configured to receive the first constant potential signal, and a second electrode of the eighth transistor is electrically connected to the output terminal.

5. The gate drive circuit according to claim 2, wherein a channel width-to-length ratio of the driving transistor is larger than that of any one of the other transistors.

6. The gate drive circuit according to claim 2, wherein during the display period, the first control signal is a square wave signal in inverse phase to the first clock signal.

7. The gate drive circuit according to claim 2, wherein the gate drive circuit is arranged in a non-display region around a display region of a touch display panel, wherein the display region comprises a plurality of touch electrodes and a plurality of touch signal leads electrically connected to the touch electrodes, the touch electrodes being configured to receive touch driving signals through the touch signal leads; and, wherein during the touch-control period, a phase and a frequency of the touch scanning signal are the same as those of the touch driving signal respectively, and an amplitude of the touch scanning signal is less than or equal to that of the touch driving signal.

8. The gate drive circuit according to claim 2, wherein during the touch-control period, the touch scanning signal is the first constant potential signal.

9. A cascade gate drive circuit, comprising a plurality of gate drive circuits, wherein each gate drive circuit comprises a driving transistor and a switching transistor, wherein
a gate electrode of the switching transistor is configured to receive a first switching signal, a first electrode of the switching transistor is configured to receive a second switching signal, a second electrode of the switching transistor is electrically connected to a gate electrode of the driving transistor, a first electrode of the driving transistor is configured to receive a first control signal, and a second electrode of the driving transistor is electrically connected to an output terminal; and, wherein
during a display period, the first control signal is a display scanning signal, the first switching signal switches the switching transistor off, the driving transistor is switched on upon reception of a display switching signal, and the driving transistor outputs the display scanning signal; and during a touch-control period, the first control signal is a touch scanning signal, the first switching signal switches the switching transistor on, the second switching signal switches the driving transistor on, and the driving transistor outputs the touch scanning signal.

10. The cascade gate drive circuit according to claim 9, wherein each of the gate drive circuits further comprises a first transistor, a second transistor, a third transistor, a fourth transistor, a fifth transistor, a sixth transistor, a first capacitor and a second capacitor; wherein a gate electrode of the first transistor is configured to receive a first switch-on signal, a first electrode of the first transistor is configured to receive a first power supply signal, and a second electrode of the first transistor and the gate electrode of the driving transistor are both electrically connected to a first node;

a gate electrode of the second transistor is configured to receive a second switch-on signal, a first electrode of the second transistor is configured to receive a second power supply signal, and a second electrode of the second transistor and the gate electrode of the driving transistor are both electrically connected to the first node;

a gate electrode of the third transistor and a gate electrode of the fifth transistor are both connected to a second node, a first electrode of the third transistor is configured to receive a first constant potential signal, and a second electrode of the third transistor is electrically connected to the first node;

a gate electrode of the fourth transistor is electrically connected to the first node, a first electrode of the fourth transistor is configured to receive the first constant potential signal, and a second electrode of the fourth transistor is electrically connected to the second node;

a first electrode of the fifth transistor is configured to receive the first constant potential signal, and a second electrode of the fifth transistor is electrically connected to the output terminal;

a gate electrode of the sixth transistor is configured to receive a first clock signal, a first electrode of the sixth transistor is configured to receive the first constant potential signal, and a second electrode of the sixth transistor is electrically connected to the output terminal;

a first electrode of the first capacitor is configured to receive the first control signal, and a second electrode of the first capacitor is electrically connected to the second node; and a first electrode of the second capacitor is electrically connected to the first node, and a second electrode of the second capacitor is electrically connected to the output terminal.

11. The cascade gate drive circuit according to claim 10, further comprising a plurality of gate drive sub-circuits, wherein each of the gate drive sub-circuits comprises a sub-driving transistor, a sub-first transistor, a sub-second transistor, a sub-third transistor, a sub-fourth transistor, a sub-fifth transistor, a sub-sixth transistor, a sub-first capacitor and a sub-second capacitor; wherein a gate electrode of the sub-driving transistor is electrically connected to a sub-first node, the first electrode of the sub-driving transistor is configured to receive a second clock signal, and the second electrode of the sub-driving transistor is electrically connected to the output terminal;

a gate electrode of the sub-first transistor is configured to receive a first switch-on signal, a first electrode of the sub-first transistor is configured to receive a first power supply signal, and a second electrode of the sub-first transistor is electrically connected to the sub-first node;

a gate electrode of the sub-second transistor is configured to receive a second switch-on signal, a first electrode of the sub-second transistor is configured to receive a second power supply signal, and a second electrode of the sub-second transistor is electrically connected to the sub-first node;

a gate electrode of the sub-third transistor and a gate electrode of the sub-fifth transistor are both connected to a sub-second node, a first electrode of the sub-third transistor is configured to receive a first constant potential signal, and a second electrode of the sub-third transistor is electrically connected to the sub-first node;

a gate electrode of the sub-fourth transistor is electrically connected to the sub-first node, a first electrode of the sub-fourth transistor is configured to receive the first constant potential signal, and a second electrode of the sub-fourth transistor is electrically connected to the sub-second node;

a first electrode of the sub-fifth transistor is configured to receive the first constant potential signal, and a second electrode of the sub-fifth transistor is electrically connected to the output terminal;

a gate electrode of the sub-sixth transistor is configured to receive a first clock signal, a first electrode of the sub-sixth transistor is configured to receive the first constant potential signal, and a second electrode of the sub-sixth transistor is electrically connected to the output terminal;

a first electrode of the sub-first capacitor is configured to receive the first control signal, and a second electrode of the sub-first capacitor is electrically connected to the sub-second node; and a first electrode of the sub-second capacitor is electrically connected to the sub-first node, and a second electrode of the sub-second capacitor is electrically connected to the output terminal.

12. The cascade gate drive circuit according to claim 11, wherein the gate electrode of the sub-driving transistor is configured to receive only the signals transmitted via the sub-first transistor, the sub-second transistor and the sub-third transistor.

13. The cascade gate drive circuit according to claim 11, comprising a plurality of gate drive circuit groups, wherein each of the gate drive circuit groups comprises a plurality of the gate drive circuits scanned successively, and one gate drive sub-circuit is arranged between any two adjacent gate drive circuit groups.

14. A method for driving a cascade gate drive circuit, wherein the cascade gate drive circuit comprises a plurality of gate drive circuits, each gate drive circuit comprises a driving transistor and a switching transistor, wherein a gate electrode of the switching transistor is configured to receive a first switching signal, a first electrode of the switching transistor is configured to receive a second switching signal, a second electrode of the switching transistor is electrically connected to a gate electrode of the driving transistor, a first electrode of the driving transistor is configured to receive a first control signal, and a second electrode of the driving transistor is electrically connected to an output terminal;

during a display period, the first control signal is a display scanning signal, the first switching signal switches the switching transistor off, the driving transistor is switched on upon reception of a display switching signal, and the driving transistor outputs the display scanning signal; and during a touch-control period, the first control signal is a touch scanning signal, the first switching signal switches the switching transistor on, the second switching signal switches the driving transistor on, and the driving transistor outputs the touch scanning signal, a duration of one frame comprises a display period and a touch-control period that are continuous to each other;

during the display period, the plurality of gate drive circuits are scanned successively to output the display scanning signals sequentially; and during the touch-control period, the plurality of gate drive circuits are scanned simultaneously to output the touch scanning signal simultaneously.

15. A method for driving the cascade gate drive circuit according to claim 13, wherein a duration of one frame comprises a plurality of repeated groups of continuous display period, suspension period and touch-control period, wherein during the display period, at least one gate drive circuit in the gate drive circuit groups is scanned successively, and the gate drive circuit outputs the display scanning signal sequentially;

after the last gate drive circuit in the gate drive circuit group is scanned, the suspension period is entered, during which the scanning is stopped at the gate drive sub-circuit next to the last gate drive circuit in the gate drive circuit group;

during the touch-control period, all of the gate drive circuits in all of the gate drive circuit groups are scanned simultaneously and output the touch scanning signals simultaneously; and after the touch-control period ends, during the immediately next display period, the gate drive sub-circuit at which the scanning was stopped in the suspension period starts to output the display scanning signals.

* * * * *